Figure 1:
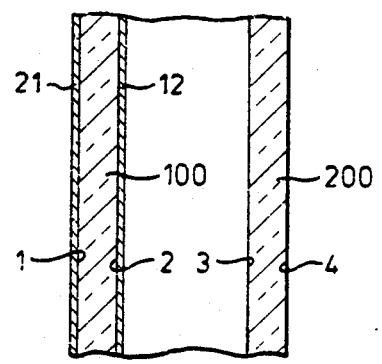

United States Patent [19]

Terneu et al.

[11] Patent Number: 4,687,687

[45] Date of Patent: Aug. 18, 1987

[54] TRANSPARENT GLAZING PANELS

[75] Inventors: Robert Terneu, Thiméon; Jean Roucour, Montignies-le-Tilleul, both of Belgium

[73] Assignee: Glaverbel, Brussels, Belgium

[21] Appl. No.: 844,316

[22] Filed: Mar. 26, 1986

[30] Foreign Application Priority Data

Mar. 28, 1985 [GB] United Kingdom ................. 8508092

[51] Int. Cl.$^4$ ............................................. E06B 3/24
[52] U.S. Cl. ....................................... 428/34; 428/38; 428/46; 428/432; 428/336; 52/171
[58] Field of Search ...................... 428/34, 38, 46, 428, 428/432, 433, 336, 697; 52/171, 788

[56] References Cited

U.S. PATENT DOCUMENTS

| | | | |
|---|---|---|---|
| 2,564,708 | 8/1951 | Mochel | 428/336 |
| 3,510,343 | 5/1970 | Twells | 428/432 |
| 4,187,336 | 2/1980 | Gordon | 428/34 |
| 4,568,578 | 2/1986 | Arfsten et al. | 428/34 |

FOREIGN PATENT DOCUMENTS 2134444 8/1984 United Kingdom ................. 428/433

Primary Examiner—John E. Kittle
Assistant Examiner—Beth A. Bozzelli
Attorney, Agent, or Firm—Spencer & Frank

[57] ABSTRACT

A transparent glazing panel comprising at least one sheet of coated glazing material bears on a first sheet face 3 a first light transmitting coating 13 at least 400 nm in thickness which comprises doped tin oxide and/or doped indium oxide and reduces the emissivity of that sheet face in respect of infra-red radiation having wavelengths in excess of 3 μm. On a second sheet face 1, the panel bears a second light transmitting metal oxide coating 21 which comprises at least 30% tin and at least 30% titanium calculated as weight percent of the respective dioxide in that second coating. The second coating 21 increases the reflectivity of that sheet face in respect of normally incident visible light to at least 20%, while the light absorbing properties of that second coating are such that it has a computed internal transmission factor in respect of visible light of at least 60%.

12 Claims, 3 Drawing Figures

TRANSPARENT GLAZING PANELS

This invention relates to a transparent glazing panel comprising at least one sheet of coated glazing material. The use of coated glazing material for various purposes is well known. For example it is known to provide a glazing panel with a coating design to reduce heat losses from a glazed structure to provide thermal insulation. There is a problem which arises in respect of coatings used for thermal screening purposes. In general, such coatings reduce the emissivity of the coated sheet face in respect of infra-red radiation having wavelengths in excess of 3 $\mu$m. Thin metallic coatings are often used commercially as such low emissivity coatings, but these are easily abraded and/or weathered. It would of course be possible to locate such a coating on an internal sheet face of a hollow glazing panel, but this can detract from the optical performance of the coating, and it does not entirely solve the problem of weathering, since atmospheric pollutants and moisture may eventually enter the interior space of the hollow glazing panel and so result in corrosion of the coating. Other examples of such low emissivity coatings as commercially used are thin oxide coatings having a low electrical resistance such as doped tin oxide coatings. Such coatings exhibit an unpleasant interferential colour in reflection. It is also known to provide a glazing panel with a coating designed to reduce transmission of solar radiation to provide solar screening for a glazed structure.

Solar screening coatings usually contain coloured oxides. We have found that various difficulties arise in ensuring that the coating has sufficient abrasion resistance and good weathering properties, while at the same time having a satisfactory coloration, in particular as regards reflected light.

The coloration of a coating in reflection is effectively determined by the refractive index of the coating material and by the thickness of the coating. The weather resistance of the coating, provided that it is formed of a material which has reasonably good inherent corrosion resistance, depends on the formation of a coating which has low porosity, and this implies a certain minimum permissible thickness.

This minimum permissible thickness for achieving satisfactory weathering resistance can be incompatible with the achievement of a desired coloration. By way of example, a coating of titanium dioxide 35 nm to 40 nm in thickness has excellent solar screening properties and exhibits a metallic aspect in reflection. Such a coating is however rather fragile and may be too easily abraded and/or weathered to have a useful working life if exposed at an outer face of the panel. It would be possible to impart additional abrasion and weathering resistance to the coating by making it thicker. For example it has been found that titanium dioxide coatings having a thickness in the range 50 nm to 60 nm can have a satisfactory abrasion resistance for use on an exposed or outer face of a panel. However increasing the thickness of such a coating will have the effect of altering its aspect in reflection, and a 50 nm to 60 nm titanium dioxide coating gives an unpleasant yellowish colour in reflection.

It is an object of the present invention to meet the demand for a glazing panel having a good combination of solar screening and thermal screening properties, and which at the same time affords an additional variable which may be controlled to permit the achievement of good weathering resistance at the same time as an aesthetically pleasing aspect.

According to the present invention, there is provided a transparent glazing panel comprising at least one sheet of coated glazing material, characterised in that such panel bears on a first sheet face thereof a first light transmitting coating at least 400 nm in thickness which comprises doped tin oxide and/or doped indium oxide and reduces the emissivity of that sheet face in respect of infra-red radiation having wavelengths in excess of 3 $\mu$m, and on a second sheet face thereof a second light transmitting metal oxide coating which comprises at least 30% tin and at least 30% titanium calculated as weight percent of the respective dioxide in the second coating, and increases the reflectivity of that sheet face in respect of normally incident visible light to at least 20%, while the light absorbing properties of that second coating are such that said second coating has an internal transmission factor in respect of visible light of at least 60% when computed in the manner herein set forth.

In order to compute the internal transmission factor of the said second coating alone, certain measurements are made on the sheet which bears that second coating. These measurements are effected after removing any other coating which that sheet may bear. The measurements are of the spectral curve of normally incident visible light reflected and transmitted by the coated sheet and are made utilising a spectrophotometer with the incident light having the spectral composition of Illuminant D65 as specified by the International Commission on Illumination (C.I.E. 17 Section 45-15-145).

The measurements are made to obtain values for

LT' the proportion of light which is transmitted by the coated sheet at a given wavelength, the light being incident normally on the coated face of the sheet;

R'' the proportion of incident light which is reflected from the non-coated face at a given wavelength when the light is normally incident on that face.

The said second coating is then removed from the sheet and a similar series of measurements is made to obtain LT the proportion of normally incident light which is transmitted by the sheeet at a given wavelength.

The refractive index (n) of the glazing material is also measured.

The internal transmission $\theta$ of the coating at that given wavelength, that is to say the proportion of light which traverses the coating and which is thus determined solely by the luminous absorption of the coating, is obtained by computation according to the following equations in which $\rho$ represents $[(n-1)/(n+1)]^2$ and $\epsilon^{-\nu t}$ represents the internal transmission of the sheet whose thickness is tcm.

$$\theta = \frac{(1-\rho) \cdot LT'}{[\rho \cdot (R'' - \rho) + (1-\rho)^2] \cdot \epsilon^{-\nu t}}, \quad (1)$$

and $$\nu = -\frac{1}{t} \cdot \ln \left\{ \frac{-(1-\rho)^2 + [(1-\rho)^4 + 4 \cdot LT^2 \cdot \rho^2]^{\frac{1}{2}}}{2 \cdot LT \cdot \rho^2} \right\} \quad (2)$$

These values of $\theta$ for the different wavelengths are then multiplied by factors according to the spectral sensitivity of the normal human eye and according to the spectral distribution of the energy radiated by the illuminant, and the integrated weighted average of those values is taken in the conventional way as laid down by the International Commission on Illumination to obtain the said internal transmission factor of the coating.

A glazing panel according to the invention presents a very useful combination of properties. In particular, it has advantages of good solar screening conferred by the reflective coating and advantages of good thermal screening conferred by the low emissivity coating.

The said first coating is at least 400 nm thick, and of doped tin oxide and/or doped indium oxide. These coatings enable favourably low emissivities to be achieved in respect of infra-red radiation having wavelengths in excess of 3 $\mu$m, they do not have an unpleasant colour in reflection (their aspect in reflection is neutral) and in the case of tin oxide particularly, can be formed as hard, abrasion and weathering resistant coatings. Such coatings may for example be formed by pyrolysis or by a vacuum deposition technique.

The said second coating comprises at least 30% tin and at least 30% titanium calculated as weight percent of the respective dioxide in the said second coating. It has been found that this gives the best compromise between the solar radiation screening properties of the said second coating (which are largely due to the presence of titanium) and good abrasion resistance (which is attributable to the presence of tin).

Such coatings may also be formed by pyrolysis or by a vacuum deposition technique. The choice of technique to be used for the formation of any particular coating may depend on plant availability at any given time. Such coatings can readily be deposited to give an aspect in reflection which is neutral or otherwise aesthetically acceptable, and this an extremely important commercial advantage.

Furthermore, the relative proportions of tin and titanium dioxide in the second coating can be varied to permit the achievement of good weathering resistance at the same time as an aesthetically pleasing aspect. We have referred to there being a certain minimum permissible thickness for a coating which has low porosity, and thus good weathering resistance. In fact, we have found that for titanium dioxide coatings this minimum thickness is about 40 nm or slightly more. By the incorporation of at least 30% tin dioxide in the coating, we have found that we can reduce the refractive index of the coating so we can increase its actual thickness without increasing its optical thickness, with the result that for the achievement of given optical properties, a thicker, and thus more weather resistant coating can be used. We have also found that this gives an improvement in the abrasion resistance of the coating. Abrasion resistance of such a said second coating is enhanced as compared with a titanium dioxide coating of the same optical thickness, because such a said second coating has a greater actual thickness, and also because the addition of tin ions modifies the nature of the said second coating in a way which is beneficial for promoting abrasion resistance. Thus it is possible to simulate a thin titanium dioxide coating, but with better aging properties.

It is thus also possible to obtain a panel having two coatings each having good abrasion and weathering resistance. Such a panel may be manipulated and set into position without taking any particular precautions.

To test the abrasion resistance of a said second coating, use can be made of an annular reciprocating rubbing member having an internal diameter of 2 cm and an external diameter of 6 cm to give a rubbing surface area of 25 cm2 and formed by a felt pad on an annular metal member. The rubbing member is set in a weighted tube (weight of assembly; 1.7 kg) sliding vertically in a support. Constant contact is thereby ensured between the rubbing member and the sample. The hole through the annular metal member forms a reservoir for an aqueous suspension of crushed sand having a mean grain diameter of 0.1 mm which is allowed to flow out between the felt pad and the coated glazing material being tested. The support carrying the rubbing member is reciprocated by a crank system, with an amplitude of 3 cm at a frequency of 1 Hz. After a certain time, a pattern of wear is obtained formed by scratches very close together, with undestroyed coating left between them, followed eventually by complete or substantially complete removal of the coating. Specific or comparative references in this specification to abrasion resistance, are references to abrasion resistance as measured by that test.

When a panel according to the invention is installed in a building with the reflective second coating on the outdoors side of the low emissivity first coating, it is found that the second coating masks or attenuates variations in apparent colour with accidental variations in thickness of the first coating. It is surprising that such an effect can be achieved by a coating which causes little reduction in total visible light transmission through the panel. In fact, by means of the invention, the use of a low emissivity coating in combination with a said second coating is quite compatible with the production of a glazing panel of high light transmissivity: such high light transmissivity can be achieved simply by using clear glazing material.

There is a further problem which is particularly apparent in respect of coatings used for thermal screening purposes. Because of the modern practice of glazing relatively large facades with coated glazing material, a stationary observer will view such material from appreciably different angles over its total area, and as a result, the perceived optical thickness of the coating material will vary from area to area, so that the perceived colour will also vary. By way of example, a coated glazing located high on a building may, when viewed from street level, appear to be one colour at the top while its bottom looks quite a different colour, even though the coating is of perfectly uniform thickness and even though the glazing appears perfectly neutral to an occupant of a room in whose wall it is located.

Due to the use of a said second coating of mixed tin and titanium oxides, the glazing panel is also very much less subject to this variable colour phenomenon.

Furthermore, the panel is relatively free from disturbing interference effects created by the presence of more than one coating.

In order to obtain a panel having a high luminous transmission, it is preferred that the thickness of the first coating is not more than 1000 nm. Accordingly, embodiments of the invention wherein said first coating has a thickness in the range 400 nm to 1000 nm inclusive are of particular advantage.

Advantageously, said panel comprises at least two sheets and said first and second coatings are borne on faces of different sheets. This simplifies manufacture since a given sheet need only be coated on one face. The invention may thus be applied to a laminated glazing pane or to a multiple glazing panel which may or may not incorporate one or more laminated panes. It is to be noted that advantages are associated with the use of a multiple glazing panel in relation to heat insulation afforded by the panel. Multiple glazing panels and laminated glazing panes can also afford an improvement in sound insulation.

Preferably, in such a multiple glazing panel, said first sheet face is an internal face of said panel. The adoption of this feature promotes reduced transmission of infrared radiation through the panel in the direction faced by that first sheet face, and the coating on that face can thereby be afforded a degree of protection against abrasion and weathering.

Advantageously, said first and second coatings are borne on sheet faces directed to the same side of the panel. Preferably, said second coating is borne on an external sheet face of the panel. Each of these features further promotes good results in terms of presenting a uniform appearance in a panel with advantageous electromagnetic radiation transmitting properties.

Preferably, said second coating increases the reflectivity of that sheet face in respect of normally incident visible light to at least 25%. The adoption of this feature gives an improved screening of incident solar radiation, and it also further promotes masking of the said variable colour phenomenon.

In the most preferred embodiments of the invention, said second coating comprises at least 50% titanium calculated as weight percent of titanium dioxide. This is found to be of benefit in promoting surface reflection of visible light at an interface between such a second coating and air.

In the most preferred embodiments of the invention, at least 95% by weight of the metal ions in the second coating consist of tin and titanium and the relative proportions of tin and titanium ions in the second coating are such as to impart to the second coating a refractive index which is not greater than 2.2. The refractive index of a thin titanium oxide coating is higher than that. The adoption of this preferred optional feature of the present invention promotes, for a given optical thickness, a greater actual thickness than a said second coating of substantially pure titanium dioxide.

The refractive index of a said coating can be measured by a variety of different ways, but it is believed that slightly different results may be achieved by the use of different techniques. References in this specification to specific values of refractive index are references to values measured by the classical ellipsometry technique as described in "Thin Film Phenomena", K. L. Chopra, McGraw Hill, 1969, pages 738 to 741, the measurement being effected using sodium D light.

In the most preferred embodiments of the invention, the thickness of the said second coating and the relative proportions of tin and titanium ions in the said second coating are such as to give interference enhancement of visible light reflection within the wavelength range less than 500 nm. In this way, the glazing material will exhibit a metallic aspect when viewed by ordinary daylight in reflection from the coated side.

Advantageously, at least one said coating is borne by sheet glass.

Such glass may be clear glass, though embodiments of the invention in which the sheet glass is tinted glass, for example, bronze glass, have light absorbing properties which are advantageous for use in certain circumstances.

Various preferred embodiments of the invention will now be described in greater detail with reference to the accompanying drawings and in the following Examples.

Figure 2:
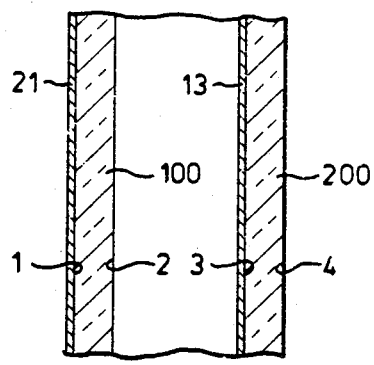
Figure 3:
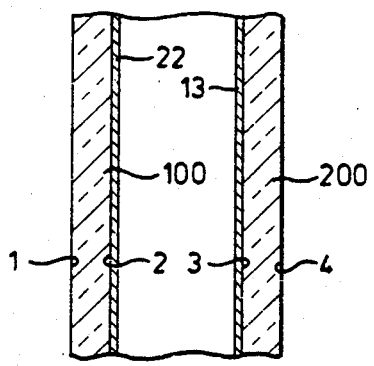

In the drawings,

FIGS. 1 to 3 are each a cross section through a detail of a panel according to the invention.

Each of the drawings shows a detail cross section through a transparent double glazing panel. The four successive faces of the two sheets are allotted reference numerals 1 to 4 from left to right in the drawings, and the two sheets are allotted reference numerals 100 and 200 respectively. Also shown in each drawing is a first coating (12 or 13) of doped indium oxide or doped tin oxide deposited on a face of a sheet, which reduces the emissivity of that sheet face in respect of infra-red radiation having wavelengths in excess of 3 μm. The first coating 12 shown in FIG. 1 lies on sheet face 2, and the first coatings 13 in FIGS. 2 and 3 lie on sheet face 3. A second coating (21 or 22) is deposited on another face of a sheet of each panel, which second coating increases the reflectivity of its respective sheet face in respect of normally incident visible light to at least 20%, while the light absorbing properties of that second coating are such that the second coating has an internal transmission factor in respect of visible light of at least 60% when computed in the manner herein set forth. Second coating 21 is deposited on sheet face 1 and second coating 22 is deposited on sheet face 2.

It will be appreciated that sheet 100 of FIG. 1, both of whose faces 1 and 2 bear coatings respectively 21 and 12, by itself constitutes a panel in accordance with this invention.

Each panel is intended to be installed in a building with its sheet face 1 directed towards the exterior.

There now follow various examples of coatings and glazing materials for use in such panels.

EXAMPLE 1

This Example is constructed in accordance with FIG. 1. Each glass sheet 100, 200 is of clear float glass which is 6 mm in thickness. One of these sheets 100 is provided with a fluorine doped tin oxide coating 12 on one of its faces 2. The coating 12 is formed to a thickness of 750 nm by a classical pyrolytic spray-coating technique in which a 6 mm thick ribbon of freshly formed hot clear float glass is conveyed through a coating station. That coating has an emissivity of less than 0.20 in respect of infra-red radiation having wavelengths in excess of 3 μm. The other face of that same sheet 100 is provided with a second coating 21 comprising tin oxide and titanium oxide.

That coating is formed by cutting a sheet from the coated ribbon of float glass which is then heated and conveyed through a coating station. The atmosphere in the coating station has a mean temperature of about 300 C., and the sheet entering that station has a mean temperature of about 600 C.

A coating precursor solution is made up using tin dibutyldiacetate and titanium diacetylacetonatediisopropylate in dimethylformamide as solvent.

This solution is sprayed at a rate of 140 liters per hour to form a coating 47.5 nm thick on the glass sheet.

The calculated composition of the second coating 21 by weight is 41% tin dioxide and 59% titanium dioxide, and that coating has a refractive index of 2.1. The second coating 21 has an internal transmission factor in respect of visible light of 74% when computed in the manner herein set forth.

The luminous reflection factor of the sheet of glass bearing coating 21 alone is 27.1% when viewed from its coated side.

The coating 21 exhibits a metallic aspect in reflection. When the abrasion resistance of the second coating of this Example is tested as hereinbefore described, after abrasion for 30 minutes, it is found that a few scratches are apparent in the coating when the coating is inspected through a microscope.

The thus coated sheet 100, which of itself constitutes a panel in accordance with this invention, is then assembled in spaced relation with the second uncoated sheet 200 to form a hollow glazing panel as shown in FIG. 1.

Various properties of the sheet 100 alone and the double panel were then measured in relation to radiant energy incident on the second coating 21 deposited on sheet face 1. The results were as follows.

|  | Sheet 100 | Double panel |
| --- | --- | --- |
| Luminous transmission factor | 60% | 54.2% |
| Luminous reflection factor | 30.9% | 33.9% |
| Luminous absorption factor | 8.9% | 11.9% |
| Energy transmission factor | 51.6% | 42.1% |
| Energy reflection factor | 23.8% | 25.9% |
| Energy absorption factor | 24.5% | 32.0% |

The luminous transmission, reflection and absorption factors of glazing panels given above and in the following examples were obtained by calculation taking account of the spectral distribution of the light source used (C.I.E. Illuminant D65) and of the sensitivity of the normal human eye to various wavelengths of light. The energy transmission, reflection and absorption factors of the glazing panels were obtained by calculation taking account of the spectral distribution of a radiator whose spectral composition is that of direct solar radiation at an elevation of 30° above the horizon (this composition being given by Moon's table for a mass of air equal to 2).

In addition, it is found that the double panel has a heat transfer coefficient (a K coefficient or U value) of 1.4 kCal.m$^{-2}$.h$^{-1}$.°C.$^{-1}$ in comparison with a value of 2.6 kCal.m$^{-2}$.h$^{-1}$.°C.$^{-1}$ for a similarly dimensioned panel lacking both coatings.

In a variant of this Example, the sheet 100 was replaced by a laminated glazing pane made up of two sheets of clear glass each 3 mm in thickness which were bonded together by means of a film of polyvinyl butyral 0.38 mm in thickness. The coatings 21, 12 were applied on to each such sheet prior to lamination, and the coated sheets were bonded together so that the coatings were located on the external faces of the laminated pane. The optical and energetical properties of that coated laminate were very similar to those of the coated sheet 100.

EXAMPLE 2

The panel of this Example differs from that of Example 1 only in that the first coating of fluorine doped tin oxide appears on sheet face 3 rather than on sheet face 2. The only difference between the formation of the second coatings 21 of this Example and of Example 1 is that in this Example that coating is formed on a freshly formed ribbon of hot glass, giving advantages in manufacture.

Various properties of the panel have been measured in relation to radiant energy incident on the second coating 21 deposited on sheet face 1. The results are as follows.

| Luminous transmission factor | 54.3% |
| --- | --- |
| Luminous reflection factor | 34.6% |
| Luminous absorption factor | 10.9% |
| Energy transmission factor | 42.2% |
| Energy reflection factor | 27.1% |
| Energy absorption factor | 30.6% |

In addition, it is again found that the panel has a heat transfer coefficient (a K coefficient or U value) of 1.4 kCal.m$^{-2}$.h$^{-1}$.°C.$^{-1}$.

EXAMPLE 3

The panel of this Example differed from that of Example 2 only in that sheet 100 on which the second coating of tin and titanium oxides is deposited is of bronze float glass, again 6 mm in thickness.

Various properties of the panel were then measured in relation to radiant energy incident on the second coating 21 deposited on sheet face 1. The results were as follows.

| Luminous transmission factor | 29.9% |
| --- | --- |
| Luminous reflection factor | 28.6% |
| Luminous absorption factor | 41.4% |
| Energy transmission factor | 25.7% |
| Energy reflection factor | 22.6% |
| Energy absorption factor | 51.5% |

In addition, it is again found that the panel has a heat transfer coefficient (a K coefficient or U value) of 1.4 kCal.m$^{-2}$.h$^{-1}$.°C.$^{-1}$.

EXAMPLE 4

The panel of this Example is as shown in FIG. 2 and comprises two sheets of clear glass each 4 mm in thickness. A doped tin oxide coating 13 is formed on face 3 of the panel to a thickness of 400 nm and with an emissivity of 0.25. A titanium/tin dioxide coating 21 is formed on face 1 of the panel as described in Example 1.

It was found that the panel has a heat transfer coefficient (a K coefficient or U value) of 1.5 kCal.m$^{-2}$.h$^{-1}$.°C.$^{-1}$.

Various properties of the panel were then measured in relation to radiant energy incident on the second coating 21 deposited on sheet face 1. The results were as follows.

| Luminous transmission factor | 61.6% |
| --- | --- |
| Luminous reflection factor | 33% |
| Luminous absorption factor | 5.3% |
| Energy transmission factor | 55.1% |
| Energy reflection factor | 26.4% |
| Energy absorption factor | 18.4% |

EXAMPLE 5

The panel of this Example is as shown in FIG. 2 and comprises two sheets of clear glass each 6 mm in thickness. A doped tin oxide coating 13 is formed on face 3 of the panel to a thickness of 750 nm and with an emissivity of less than 0.20. A titanium/tin dioxide coating 21 is formed on face 1 of the panel by spraying a coating precursor solution made up using tin dibutyldiacetate and titanium diacetylacetonatediisopropylate in dimethylformamide as solvent to form a coating 52 nm thick on the glass sheet.

The calculated composition of that coating by weight is 70% tin dioxide and 30% titanium dioxide, and that coating has a refractive index of about 2.05. The coating has an internal transmission factor in respect of visible light of about 77% when computed in the manner herein set forth.

The sheet of glass bearing the coating 21 alone has a luminous reflection factor of 25.1% when viewed from its coated side.

The coating 21 exhibits a metallic aspect in reflection. When the abrasion resistance of the second coating of this Example is tested as hereinbefore described, after abrasion for 40 minutes, it is found that a few scratches are apparent in the coating when the coating is inspected through a microscope.

It was found that the panel has a heat transfer coefficient (a K coefficient or U value) of 1.4 $kCal.m^{-2}.h^{-1}.°C.^{-1}$.

Various properties of the panel were then measured in relation to radiant energy incident on second coating 21 deposited on sheet face 1. The results were as follows.

| Luminous transmission factor | 57.8% |
|---|---|
| Luminous reflection factor | 33.8% |
| Luminous absorption factor | 8.4% |
| Energy transmission factor | 45.7% |
| Energy reflection factor | 26.4% |
| Energy absorption factor | 27.9% |

In a variant of this example, a panel bearing the same coatings was constructed as represented in FIG. 3 with the tin oxide coating placed on sheet face 2 and the titanium/tin oxide coating placed on sheet face 3. The results were as follows.

| Luminous transmission factor | 57.7% |
|---|---|
| Luminous reflection factor | 29.0% |
| Luminous absorption factor | 13.3% |
| Energy transmission factor | 45.6% |
| Energy reflection factor | 20.0% |
| Energy absorption factor | 34.4% |

EXAMPLE 6

The panel of this Example is as shown in FIG. 2 and comprises two sheets of clear glass each 6 mm in thickness. A doped tin oxide coating 13 is formed on face 3 of the panel to a thickness of 750 nm and with an emissivity of less than 0.20. A titanium/tin dioxide coating 21 is formed on face 1 of the panel to a thickness of 50 nm.

The calculated composition of that coating by weight is 31% tin dioxide and 69% titanium dioxide, and that coating has a refractive index of about 2.19. The coating has an internal transmission factor in respect of visible light of about 73% when computed in the manner herein set forth.

The sheet bearing the coating 21 alone has a luminous reflection factor of 30%.

The coating 21 exhibits a metallic aspect in reflection. When the abrasion resistance of the second coating of this Example is tested as hereinbefore described, the result was quite similar to the result indicated in Example 1.

It was found that the panel has a heat transfer coefficient (a K coefficient or U value) of 1.4 $kCal.m^{-2}.h^{-1}.°C.^{-1}$.

Various properties of the panel were then measured in relation to radiant energy incident on second coating 21 deposited on sheet face 1.

The results were as follows.

| Luminous transmission factor | 53.1% |
|---|---|
| Luminous reflection factor | 36.2% |
| Luminous absorption factor | 10.7% |
| Energy transmission factor | 41.0% |
| Energy reflection factor | 28.6% |
| Energy absorption factor | 30.4% |

We claim:

1. A transparent glazing panel comprising at least one sheet of coating glazing material, characterised in that such panel bears on a first sheet face thereof a first light transmitting coating at least 400 nm in thickness which comprises doped tin oxide and/or doped indium oxide and reduces the emissivity of that sheet face in respect of infra-red radiation having wavelengths in excess of 3 $\mu$m, and on a second sheet face thereof a second light transmitting metal oxide coating which comprises at least 30% tin and at least 30% titanium calculated as weight percent of the respective dioxide in the second coating, has a thickness of at least 40 nm, and increases the reflectivity of that sheet face in respect of normally incident visible light to at least 20%, while the light absorbing properties of that second coating are such that said second coating has an internal transmission factor in respect of visible light of at least 60% when computed in the manner herein set forth.

2. A panel according to claim 1, wherein said first coating has a thickness in the range 400 nm to 1000 nm inclusive.

3. A panel according to claim 1, wherein said panel comprises at least two sheets and said first and second coatings are borne on faces of different sheets.

4. A panel according to claim 3, wherein said first sheet face is an internal face of said panel.

5. A panel according to claim 4, wherein said first and second coatings are borne on sheet faces directed to the same side of the panel.

6. A panel according to claim 3, wherein said second coating is borne on an external sheet face of the panel.

7. A panel according to claim 1, wherein said second coating increases the reflectivity of that sheet face in respect of normally incident visible light to at least 25%.

8. A panel according to claim 1, wherein said second coating comprises at least 50% titanium calculated as weight percent of titanium dioxide.

9. A panel according to claim 1, wherein at least 95% by weight of the metal ions in the second coating consist of tin and titanium and wherein the relative proportions of tin and titanium ions in the second coating are such as to impart to the second coating a refractive index which is not greater than 2.2.

10. A panel according to claim 1, wherein the thickness of the second coating and the relative proportions of tin and titanium ions in the second coating are such as to give interference enhancement of visible light reflection within the wavelength range less than 500 nm.

11. A panel according to claim 1, wherein at least one said coating is borne by sheet glass.

12. A panel according to claim 11, wherein the sheet glass is tinted glass.

* * * * *